Oct. 19, 1965  C. BELOVE  3,212,342
MAGNETIC SMOOTHING SYSTEM
Filed Feb. 24, 1953  2 Sheets-Sheet 1

INVENTOR.
CHARLES BELOVE
BY
William R. Lane
ATTORNEY

Oct. 19, 1965
C. BELOVE
3,212,342
MAGNETIC SMOOTHING SYSTEM
Filed Feb. 24, 1953
2 Sheets-Sheet 2
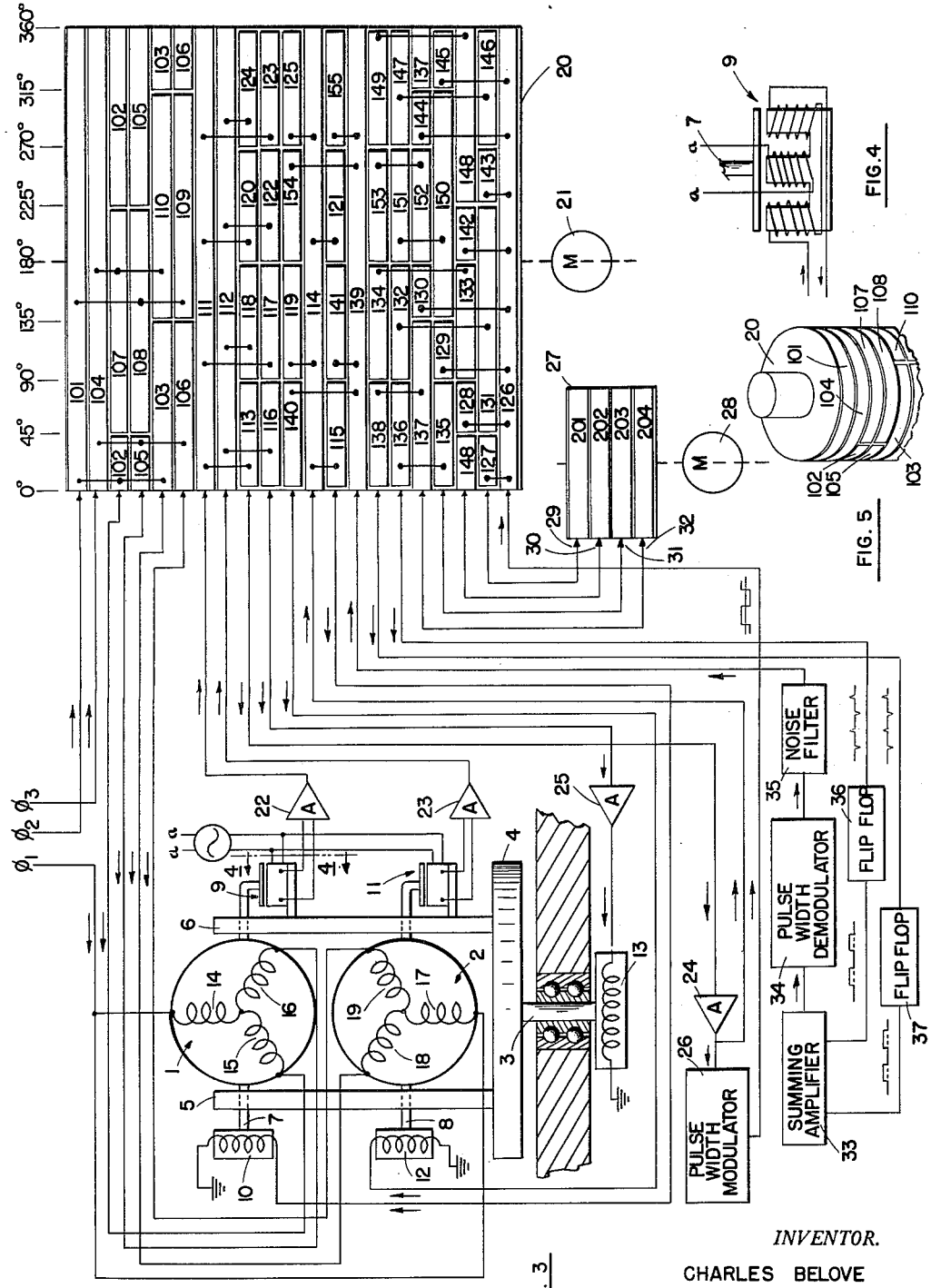
INVENTOR.
CHARLES BELOVE
BY
William R. Lane
ATTORNEY

United States Patent Office 3,212,342
Patented Oct. 19, 1965

3,212,342
MAGNETIC SMOOTHING SYSTEM
Charles Belove, Stamford, Conn., assignor to
North American Aviation, Inc.
Filed Feb. 24, 1953, Ser. No. 338,291
14 Claims. (Cl. 74—5.37)

This invention relates to smoothing systems, and particularly to a smoothing system utilizing a multichannel closed loop magnetic recorder for eliminating the ripple drift of a self-compensating gyro stabilized platform.

A self-compensating gyro stabilized platform is described in co-pending patent application Serial No. 200,234, filed December 11, 1950, now Patent No. 2,999,391, in the name of Darwin L. Freebairn et al., entitled "Self-Compensating Gyro Apparatus." The co-pending application discloses the utilization of two reversible gyroscopes to stabilize each axis of stabilization of the platform. While one of the gyroscopes is controlling the axis of stabilization the other gyroscope is caged. A gyroscope is caged when a pick-off on an axis actuates a torquer on the same axis in a manner to oppose any torques tending to rotate the gyroscope about that axis. The two reversible gyroscopes controlling a single axis of stabilization are called gyro #1 and gyro #2. Circuitry is provided to divide a complete cycle of operation into four periods. During the first and third periods, gyro #2 is connected to control the axis of stabilization, and gyro #1 is caged. During the second and fourth periods, gyro #1 is connected to control the axis of stabilization, and gyro #2 is caged. Each time either gyroscope is caged, the spin direction of its rotor is reversed.

When gyroscopes are mass produced, various imperfections in construction result in disturbing torques acting upon the gyroscope. These disturbing torques, which include bearing, lead-in, and unbalance torques, cause a progressive drift of the axis being stabilized. The greater part of the disturbing torques is independent of the spin direction of the gyroscope's rotor. The rest of the disturbing torques reverse in direction upon reversal of the spin direction of the rotor. The magnetic smoothing system contemplated by this invention compensates for the disturbing torques which are independent of the spin direction of the gyroscope's rotor.

A generalized analysis of the effect of the disturbing torques upon the drift rate of the platform for a single gyroscopic system produces the following generalized equation:

$$M_u = H\dot{\phi}$$

where $M_u$ is the resultant torque about the precession axis caused by the disturbing torques, H is the angular momentum of the gyroscope's rotor, and $\dot{\phi}$ is the rate of drift of the axis of stabilization. Where $M_u$ and H are independent of time, the total drift angle $\phi$ over a given time interval, $t$, is then $$\phi = \int \frac{M_u}{H} dt = \frac{M_u}{H} t$$

If a system is devised to periodically change the sign of angular momentum H, a cancellation of drift angle $\phi$ is achieved. Since $H = I\omega$, where I is the moment of inertia of the gyroscope's rotor, and $\omega$ is the angular velocity, the sign of angular momentum H is periodically changed by reversing the spin direction of the rotor of the gyroscope. The achievement of a cancellation of drift angle $\phi$ is shown by the following example: A rotor of a gyroscope with moment of inertia I and subjected to disturbing torque $M_u$ is rotated at an angular velocity $\omega_a$ during time $t_a$, and at an angular velocity $\omega_b$ during time $t_b$. The drift angles $\phi_a$ and $\phi_b$ are given by the equations $$\phi_a = \frac{M_u}{I\omega_a} t_a$$

and $$\phi_b = \frac{M_u}{I\omega_b} t_b$$

The total drift angle after times $t_a$ and $t_b$ is the sum of $\phi_a$ and $\phi_b$, or $$\phi_a + \phi_b = \frac{M_u}{I\omega_a} t_a + \frac{M_u}{I\omega_b} t_b$$

If $$\frac{t_a}{\omega_a} = -\frac{t_b}{\omega_b}$$

the total drift angle due to disturbing torques which are independent of the spin direction of the gyroscope is reduced to zero. This is accomplished by reversing the direction of rotation of the gyroscope's rotor, making $\omega_a = -\omega_b$, and by appropriately timed switching to make $t_a = t_b$. The drift angle therefore fluctuates around a zero value. This variation of drift angle around a zero value is called ripple drift. Since a single cycle of operation may last for over 400 seconds, this ripple drift causes material undesirable errors.

It is therefore an object of this invention to provide a magnetic smoothing system for a self-compensating gyro stabilized platform.

It is another object of this invention to provide a smoothing system utilizing a multichannel closed loop magnetic recorder for storing information useful in the elimination of the ripple drift of a self-compensating gyro stabilized platform.

It is a further object of this invention to provide a smoothing system for a self-compensating gyro stabilized platform utilizing magnetic recording means which stores information over a substantial period of time prior to the reversal of the caged gyroscope and which separately stores information over a substantial period of time after the caged gyroscope has stabilized in the reversed direction to thereby produce a corrective torque which is more nearly equal and opposite to the average disturbing torques which are independent of the spin direction of the gyroscopes.

It is another object of this invention to provide an improved smoothing system for a self-compensating gyro stabilized platform.

It is another object of this invention to produce a magnetic smoothing system which selectively stores information on a closed loop magnetic recorder, selectively sums the stored information, and actuates appropriately positioned torquers to continuously counteract the undesired disturbing torques acting on a gyroscope.

Other objects of invention will become apparent from the following description taken in connection with the accompanying drawings, in which FIG. 1 is a graphic plot of the platform drift angle versus time for a single cycle of operation of a self-compensating gyro stabilized platform without a smoothing system;

FIG. 3 is a schematic drawing of a preferred embodiment of the magnetic smoothing system contemplated by this invention;

FIG. 4 is a view of a pick-off viewed along the lines 4—4 of FIG. 3;

FIG. 5 is a perspective view of a portion of the drum switch of the magnetic smoothing system of FIG. 3;

Figure 6:
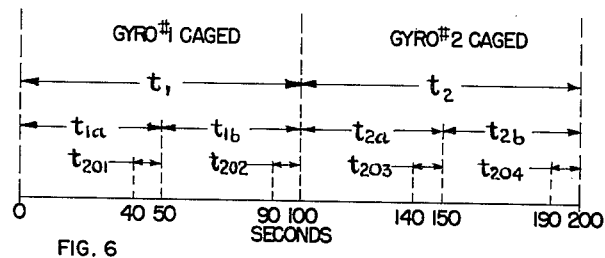

And FIG. 6 is a plot of the timing of the storage of information on the various channels of the magnetic recorder of the magnetic smoothing system of FIG. 3.

Figure 1:
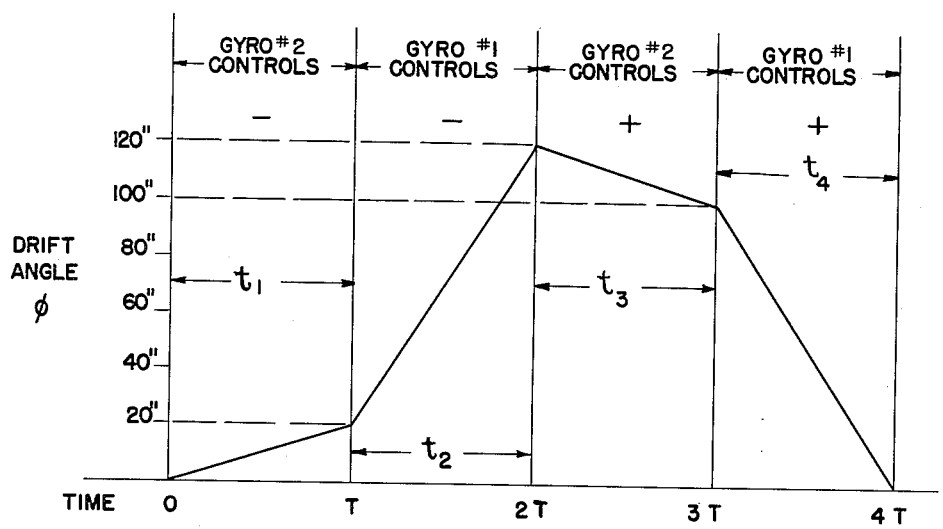
Figure 2:
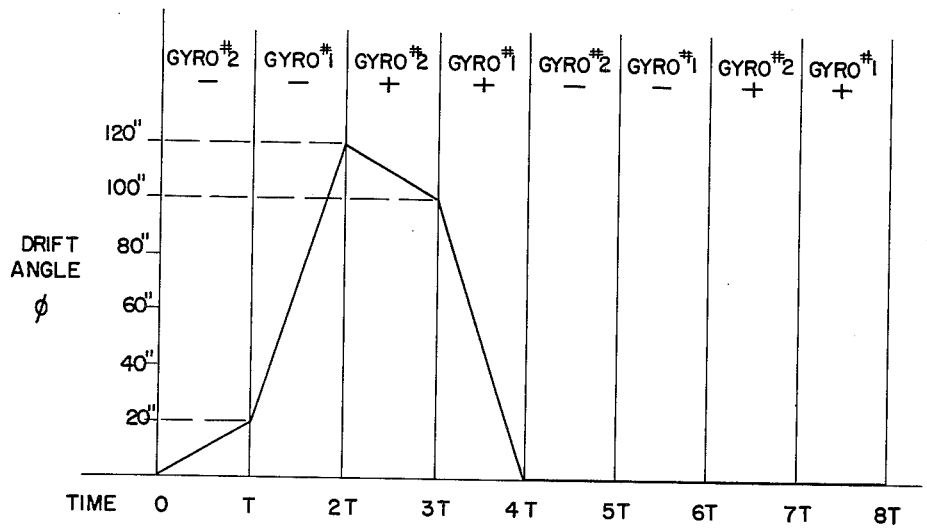
FIG. 2 is a graphic plot of the platform drift angle versus time for the first two cycles of operation of a self-compensating gyro stabilized platform utilizing the magnetic smoothing system of this invention.

Referring to FIG. 1, a plot is shown of a single cycle of the ripple drift which appears on an output axis when a self-compensating gyro stabilized platform is operated without a smoothing system. The single cycle of operation of FIG. 1 utilizes two gyroscopes alternately controlling the axis of stabilization. The single cycle of operation is divided into four periods: $t_1$, $t_2$, $t_3$, and $t_4$. During times $t_1$ and $t_3$, gyro #2 controls the axis of stabilization while gyro #1 is caged. During times $t_2$ and $t_4$, gyro #1 controls the axis of stabilization while gyro #2 is caged. Each of the gyroscopes is reversed between the periods of its control, thereby reversing the direction of the drift caused by the disturbing torques acting on that gyroscope. Times $t_1$ and $t_2$ are further subdivided into times $t_{1a}$ and $t_{1b}$ and times $t_{2a}$ and $t_{2b}$, respectively, as is indicated in FIG. 6. Time $t_{1a}$ is the portion of time $t_1$ before reversal of gyro #1, and $t_{1b}$ is the portion after reversal of gyro #1. Similarly, time $t_{2a}$ is the portion of time $t_2$ before reversal of gyro #2, and $t_{2b}$ is the portion after reversal of gyro #2. It can readily be seen by referring to FIG. 1, that only during comparatively short periods of time is the drift angle negligible. In view of the long periods of time needed to complete a single cycle of operation, this ripple drift is very undesirable in a precision platform. Since this ripple drift is caused by the disturbing torques acting on the gyroscope, it is eliminated by continuously subjecting the gyroscope to a counter-torque equal and opposite to the resultant of the disturbing torques. If the magnitude and direction of the disturbing torques are found during the first cycle of operation and the counter-torques applied during the second cycle of operation, the plot of drift angle versus time appears as indicated in FIG. 2.

The problem is to find the magnitude and direction of the disturbing torques, to store this information, and to apply a counter or corrective torque of the proper magnitude and direction to continuously counteract the disturbing torques. Various devices for performing these functions have been disclosed in co-pending patent application Serial No. 257,854 filed November 23, 1951, in the name of Joseph E. Picardi et al., entitled "Smoothing System," and patent application Serial No. 325,655, filed December 12, 1952, in the name of Robert M. Ashby, entitled "Electronic Smoothing System." Both of these applications find the magnitude and direction of the disturbing torques $M_{u1}$ and $M_{u2}$ acting on gyroscopes #1 and #2, respectively, by utilizing the following formulae:

$$M_{1a} = M_{u1} + \frac{H_1}{H_2} M_{u2} \qquad (1)$$

$$M_{1b} = M_{u1} - \frac{H_1}{H_2} M_{u2} \qquad (2)$$

where $M_{1a}$ is the torque about the precession axis of gyro #1 during the time $t_{1a}$ when gyro #2 is in control of the axis of stabilization and gyro #1 is caged and both gyroscopes are spinning in an assumed positive direction, $M_{1b}$ is the torque about the precession axis of gyro #1 during time $t_{1b}$ after reversal of its spin direction, $H_1$ is the angular momentum of gyro #1, and $H_2$ is the angular momentum of gyro #2. The negative sign in Equation 2 is the result of reversing the angular velocity component of angular momentum $H_1$. Since the rotors of gyro #1 and gyro #2 have identical moments of inertia and are driven at the same synchronous speed, $H_1$ is numerically equal to $H_2$. Equations 1 and 2 therefore reduce to:

$$M_{1a} = M_{u1} + M_{u2} \qquad (3)$$

$$M_{1b} = M_{u1} - M_{u2} \qquad (4)$$

By adding Equations 3 and 4 disturbing torques $M_{u1}$ are found $$M_{u1} = \tfrac{1}{2}(M_{1a} + M_{1b}) \qquad (5)$$

Similarly, $$M_{u2} = \tfrac{1}{2}(M_{2a} + M_{2b}) \qquad (6)$$

where $M_{2a}$ is the torque about the precession axis of gyro #2 during time $t_{2a}$ and $M_{2b}$ is the torque about the precession axis of gyro #2 during time $t_{2b}$. During times $t_{2a}$ and $t_{2b}$, gyro #1 is in control of the axis of stabilization and gyro #2 is caged. During time $t_{2a}$, gyro #1 is spinning in a negative direction and gyro #2 is spinning in a positive direction. During time $t_{2b}$, gyro #1 continues spinning in a negative direction while gyro #2 is spinning in a negative direction. Since $M_{1a}$ and $M_{1b}$ are proportional to the outputs of a pick-off on the precession axis of caged gyro #1, and $M_{2a}$ and $M_{2b}$ are proportional to the outputs of a pick-off on the precession axis of caged gyro #2, a voltage proportional to each is easily obtained. It is necessary to store this information, however, since the values of these outputs are never obtainable simultaneously.

The above-mentioned Picardi et al. and Ashby patent applications disclose means for storing this information, means for appropriately summing the information, and means for applying the proper corrective torques. However, these disclosures are essentially of the "last chance" variety. The information which is stored is only that value which is applied to the storing means at the last instant of coupling with the pick-off. This value may or may not be the average value desired. If it is not, the corrective torques applied to the gyroscopes, during the times each gyroscope controls the axis of stabilization, does not exactly counteract the disturbing torques. A small residual torque remains, causing drift errors on the platform.

The magnetic smoothing system of this invention produces a corrective torque which more nearly equals the average disturbing torques over the period of time involved. Referring to the schematic drawing of the preferred embodiment of this invention as shown in FIG. 3, two gyroscopes 1 and 2 are positioned with their input axis coincident with the axis of stabilization which is defined by the center line of shaft 3. Shaft 3 supports gyroscope platform 4. Mounted on gyroscope platform 4 are supporting brackets 5 and 6. Shafts 7 and 8 are supported by brackets 5 and 6 and define the precession axes of gyroscopes 1 and 2, respectively. Pick-off 9, shown in detail in FIG. 4, is positioned to detect rotational movement of shaft 7. Corrective torquer 10 is positioned to apply torque about shaft 7. Pick-off 11, which is similar to pick-off 9, is positioned to detect rotational movement of shaft 8. Corrective torquer 12 is positioned to apply torque about shaft 8. Main platform torquer 13 is positioned to apply torque about shaft 3.

The rotor of gyroscope 1 is driven at synchronous speed by a motor having three-phase stator windings 14, 15, and 16. The rotor of gyroscope 2 is driven at synchronous speed by a motor having three-phase stator windings 17, 18, and 19. A source of three-phase power (not shown) is connected to the three-phase gyroscope windings, either directly, as between phase $\phi_1$ and windings 14 and 17; or indirectly, through strips on drum switch 20, as between phases $\phi_2$ and $\phi_3$ and windings 15, 16, 18, and 19. Drum switch 20 consists of a plurality of cylindrical strips, shown flat in FIG. 3 for convenience, driven a a synchronous speed by motor 21. A perspective view of a portion of cylindrical drum 20 is shown in FIG. 5. Contact to each strip from external circuitry is made by means of a brush. Each strip is electrically insulated from every other strip and from the separate segments of the same strip as evidenced by breaks in the individual strips. Internal connections, selectively connecting the various segments, are indicated in FIG. 3 by the heavy vertical line with a heavy dot to indicate contact with a given strip or segment of strip. Since the strips are actually cylindrical instead of flat, the rotation of drum 20 by motor 21 will repeat the switching sequence at a predetermined frequency. In the example described this frequency is one cycle every 400 seconds. One complete cycle of operation of drum switch 20 from 0° to 360° is shown in FIG. 3.

The operation of the magnetic smoothing system of this invention can best be described by following through a single cycle of operation explaining each of the various circuits. Periodic reversal of the spin direction of the rotors of gyroscopes 1 and 2 is obtained by reversing the connections between two of the windings on each gyroscope and the source of three phase power. Phase $\phi_1$ of the three phase source is connected directly to windings 14 and 17 of gyroscopes 1 and 2, respectively. Phase $\phi_2$ is connected through a brush to strip 101 of drum 20. Since strip 101 is connected internally on drum 20 to strips 102 and 103, and since strips 102 and 103 are initially connected to windings 15 and 18, respectively, the circuit is completed between phase $\phi_2$ and windings 15 and 18 of gyroscopes 1 and 2, respectively. Phase $\phi_3$ is connected to strip 104. Strip 104 is connected internally to strips 105 and 106. Since strips 105 and 106 are initially connected to windings 16 and 19, respectively, the circuit is completed between phase $\phi_2$ and windings 15 and 18 of gyroscopes 1 and 2, respectively. Therefore, initially the rotors of gyroscopes 1 and 2 are spinning in what is assumed to be a positive direction.

After 45° rotation of drum 20 by motor 21, strips 102 and 105 terminate and the brushes connected to windings 15 and 16 make contact with strips 107 and 108, respectively. Since strip 107 is connected internally to strip 104 and strip 108 is connected internally to strip 101, the phase sequence of rotor motor windings 14, 15, and 16 of gyroscope 1 is reversed. The direction of rotation of the rotor of gyroscope 1 is correspondingly reversed. Gyroscope 2 continues to rotate in the original direction, since windings 18 and 19 continue to be connected to strips 103 and 106, respectively. Gyroscope 1 is now spinning in a negative direction while gyroscope 2 continues to spin in a positive direction.

After 135° rotation of drum 20, strips 103 and 106 terminate and phase $\phi_2$ is now connected to winding 19 through strips 101 and 109 while phase $\phi_3$ is connected to winding 18 through strips 104 and 110. The spin direction of gyroscope 2 is reversed and both gyroscopes are now spinning in a negative direction. After 225° rotation of drum 20, windings 15 and 16 are again connected to strips 102 and 105, respectively, and the rotor of gyroscope 1 again reverses and starts to spin in a positive direction. Similarly, after 315° rotation of drum 20, windings 18 and 19 are again connected to strips 103 and 106, respectively, and gyro 2 again spins in a positive direction. Thus, it can readily be seen that gyroscopes 1 and 2 periodically reverse in spin direction, spinning half a cycle of operation in a positive direction and half a cycle of operation in a negative direction.

Drum switch 20 also accomplishes the alternation of the control of the axis of stabilization between gyroscopes 1 and 2 while caging the gyroscope which is not in control. E type inductive pick-off 9, shown in detail in FIG. 4, is positioned with its armature attached to shaft 7. The winding around the center core of pick-off 9 is connected to a source (not shown) of 400 c.p.s. A.-C. potential indicated by connections "a—a". The output of pick-off 9 is fed to detector-amplifier 22 which has a D.-C. output the amplitude and polarity of which is directly proportional to the magnitude and direction, respectively, of rotation of shaft 7 from a neutral position. A similar E type inductive pick-off 11 is positioned with its armature attached to shaft 8. The winding around the center core of pick-off 11 is also connected to the source of 400 c.p.s. A.-C. potential. The output of pick-off 11 is fed into detector-amplifier 23 which has a D.-C. output the amplitude and polarity of which is directly proportional to the magnitude and direction, respectively, of rotation of shaft 8 from a neutral position.

Initially the output of pick-off 9 is connected to actuate torquer 10 by means of amplifier 22, strips 111 and 113, caging amplifier 24, and strips 114 and 115. The torque applied to shaft 7 by torquer 10 is in a direction to maintain the armature of pick-off 9 in its neutral position. Gyroscope 1 is therefore effectively caged. Initially the output of pick-off 11 is connected to actuate main torquer 13 by means of amplifier 23, strips 112 and 116, and main torquer amplifier 25. Gyroscope 2 is initially in control of the axis of stabilization.

Every quarter cycle of operation the control over the axis of stabilization is switched between the gyroscopes 1 and 2, and the noncontrolling gyroscope is caged. After 90° rotation of drum 20, strips 113, 115, and 116 terminate. Strip 111 is connected to strip 117, strip 112 is connected to strip 118, and strip 114 is connected to strip 119. From 90° to 180° rotation of drum 20, pick-off 9 is connected to actuate main torquer 13 by means of amplifier 22, strips 111 and 117, and main torquer amplifier 25. Gyro 1 is therefore in control of the axis of stabilization. At the same time, pick-off 11 is connected to actuate correction torquer 12 by means of amplifier 23, strips 112 and 118, caging amplifier 24, and strips 114 and 119. The torque applied to shaft 8 by torquer 12 is in a direction to maintain the armature of pick-off 11 in its neutral position. Gyroscope 2 is therefore effectively caged.

After 180° rotation of drum 20, the outputs of pick-offs 9 and 11 are again switched. Pick-off 9 is connected to actuate torquer 10. Pick-off 11 is connected to actuate main torquer 13. Thus, gyro 2 is again in control of the axis of stabilization while gyro 1 is caged. It is to be noted, however, that due to the switching arrangement previously described, the rotation of gyroscope 2 is now in the opposite direction from its rotation during the first quarter cycle. Similarly, after 270° rotation of drum 20, the control of the axis of rotation is again switched. This time gyroscope 1 is placed in control and since the direction of rotation of the rotor of gyroscope 1 was reversed at 225° rotation it also spins in a direction opposite to its direction of spin during the second quarter cycle. During this last quarter cycle of operation, pick-off 9 is connected to actuate main torquer 13 and pick-off 11 is connected to actuate corrective torquer 12.

In the preceding portion of this application the periodic reversal of gyroscopes, the periodic switching of the control function between the two gyroscopes, and the caging of the gyroscope which is not in control have been described. The gyro stabilized system thus far described is subjected to the undesirable ripple drift. The circuit used to eliminate this ripple drift utilizes the outputs of caging amplifier 24 which are proportional to torques $M_{1a}$, $M_{1b}$, $M_{2a}$, and $M_{2b}$ to obtain corrective torques $M_{c1}$ and $M_{c2}$ to be applied to gyroscopes 1 and 2 to eliminate this ripple drift by continuously opposing disturbing torques $M_{u1}$ and $M_{u2}$.

Referring now to FIG. 3, the output of caging amplifier 24 is coupled as an input to a pulse width modulator 26. It is to be noted that the output of caging amplifier 24 has a different value during each of times $t_{1a}$, $t_{1b}$, $t_{2a}$, and $t_{2b}$. By recording each of the outputs on different channels of a magnetic recorder 27, the outputs are made available at a later time for producing the proper corrective torques which are applied to gyroscopes 1 and 2 to completely oppose disturbing torques $M_{u1}$ and $M_{u2}$. Drum 27 is therefore constructed with four separate closed loop channels and is rotated at a synchronous speed by means of motor 28. In the preferred embodiment, drum 27 makes about forty revolutions for every complete cycle of operation of the smoothing system. Heads 29, 30, 31, and 32 on channels 201, 202, 203, and 204, respectively, of magnetic recorder 27 are a combination recording and reading head. Erasure of the previously recorded signals is unnecessary since the amplitude of the pulse width modulated signal being recorded is sufficient to saturate the channel effectively erasing all previously recorded signals. Each channel therefore effectively stores approximately ten records of signal proportional to one of the caging torques.

Initially, the output of modulator 26 is connected through strip 126 and 127 to recording head 29, thereby recording the output signals on channel 201. After 45° rotation of drum 20, the output of modulator 26 is disconnected from recording head 29 and connected to recording head 30 through strips 126 and 128. The signals are recorded on channel 202 by head 30 during the second half of the first quarter cycle of operation. Since, during the first half of the first quarter cycle of operation, the output of caging amplifier 24 is a voltage which is proportional to torque $M_{1a}$, the pulse width signal recorded on channel 201 of drum 27 is a function of torque $M_{1a}$. During the second half of the first quarter cycle of operation, the output of caging amplifier 24 is a voltage which is proportional to torque $M_{1b}$ and therefore the pulse width signal recorded on channel 202 of drum 27 is a function of torque $M_{1b}$.

During the first half of the second quarter cycle of operation, the output of caging amplifier 24 is a voltage which is proportional to torque $M_{2a}$. During this half of the second quarter cycle, the output of caging amplifier 24 is connected through pulse width modulator 26 and strips 126 and 129 to recording head 31. Therefore, the pulse width signal recorded on channel 203 is a function of torque $M_{2a}$. Similarly, during the last half of the second quarter cycle of operation, the output of caging amplifier 24, which is proportional to torque $M_{2b}$, is fed through pulse width modulator 26 and strips 126 and 130 to recording head 32. The pulse width signal recorded on channel 204 is therefore a function of torque $M_{2b}$. Channel 201 stores information proportional to torque $M_{1a}$, channel 202 stores information proportional to torque $M_{1b}$, channel 203 stores information proportional to torque $M_{2a}$, and channel 204 stores information proportional to torque $M_{2b}$.

Referring to Equations 5 and 6 above, voltages proportional to disturbing torques $M_{u1}$ and $M_{u2}$ are obtainable by selectively summing the information recorded on the four channels. It is desired to apply corrective torques $M_{c1}$ and $M_{c2}$ to gyroscopes 1 and 2, respectively, by means of corrective torquers 10 and 12, respectively. Torques $M_{c1}$ and $M_{c2}$ are of a magnitude and in a direction to exactly and continuously oppose disturbing torques $M_{u1}$ and $M_{u2}$, respectively. Considering the second quarter cycle of operation when gyroscope 1 is in control of the axis of stabilization, head 29, acting now as a reading head, detects the information stored on channel 201 and couples the signal, which is a series of positive and negative pulses, as an input into flip-flop circuit 36 through strips 131 and 132. At the same time, head 30, also acting as a reading head, detects the information stored on channel 202 and couples the resultant signal, which is also a series of positive and negative pulses, as an input to flip-flop circiut 37 through strips 133 and 134. The outputs of flip-flop circuits 36 and 37 are pulse width modulated signals and are coupled as separate inputs into summing amplifier 33. The output of summing amplifier 33 is a function of the sum of torques $M_{1a}$ and $M_{1b}$, and hence of $M_{u1}$. Passing this output through pulse width demodulator 34 and noise filter 35 produces a D.-C. signal whose amplitude and direction, polarity is proportional to the magnitude and direction, respectively, of torque $M_{u1}$. Coupling this signal through strips 139 and 141 to corrective torquer 10 produces corrective torque $M_{c1}$ which is applied to gyroscope 1 to continuously counteract the disturbing torquer $M_{u1}$ acting on gyroscope 1.

Similarly, during the third quarter cycle of operation when gyroscope 2 is in control of the axis of stabilization, the signals proportional to torques $M_{2a}$ and $M_{2b}$ which are stored on channels 203 and 204, respectively, are detected by heads 31 and 32 and coupled through flip-flop circuits 36 and 37, respectively, to summing amplifier 33 by means of strips 150 and 151 and strips 152, and 153, respectively. The output signals of flip-flop circuits 36 and 37 are pulse width modulated signals which are a function of torques $M_{2a}$ and $M_{2b}$, respectively, and are coupled as separate inputs into summing amplifier 33. The output of summing amplifier 33 during this quarter cycle of operation is therefore a function of the sum of torques $M_{2a}$ and $M_{2b}$, and hence of $M_{u2}$. Passing this output through pulse width demodulator 34 and noise filter 35 produces a D.-C. signal whose amplitude and polarity is proportional to the magnitude and direction, respectively, of torque $M_{u2}$.

During the first and second halves of the fourth quarter cycle of operation the outputs of caging amplifier 24 are functions of $M_{2b}$ and $M_{2a}$, respectively. The output of modulator 26 during the first half of this cycle is fed through strips 126 and 144 to recording head 32. Since this output is a function of torque $M_{2b}$, channel 204 stores information which is a function of a new torque $M_{2b}$. The output of modulator 26 during the second half of the quarter cycle is fed through strips 126 and 145 to recording head 31. Channel 203 therefore stores information proportional to new torque $M_{2a}$.

While the new values of $M_{2a}$ and $M_{2b}$ are being recorded on channels 203 and 204, respectively, the sum of the information stored during the third quarter cycle on channels 201 and 202 is obtained from summing amplifier 33 and applied to torquer 10 to cause torquer 10 to produce a new corrective torque $M_{c1}$ counteracting the new value of disturbing torquer $M_{u1}$. Thus, it is evident that the smoothing system of this invention automatically corrects for any change in the magnitude of the disturbing torques.

Referring to FIG. 6, the improved accuracy of the magnetic smoothing system of this invention over other smoothing systems is evidenced. In the example used to more clearly point out this invention, gyroscope 1 is caged during time $t_1$ which is approximately of 100 seconds duration. During time $t_{1a}$ of about 50 seconds duration, gyroscope 1 is spinning in an assumed positive direction. The caging torque during this time is a measure of torque $M_{1a}$. A pulse width modulated signal proportional to the caging torque is continuously recorded on channel 201 of magnetic drum recorder 27. Drum 27, however, makes one complete revolution every 10 seconds with head 29 on channel 201 erasing previously recorded signals as it records new signals. Therefore, ten seconds of pulse width modulated signals proportional to torque $M_{u1}$ remain recorded on channel 201. Similarly, after time $t_{1b}$, the last ten seconds of pulse width modulated signals proportional to torque $M_{1b}$ remain stored on channel 202. In FIG. 6, times $t_{201}$ and $t_{202}$ indicate the time range of the permanently stored information. During time $t_2$ the information stored on channels 201 and 202 is continuously detected, and by appropriate circuitry actuates torquer 10 to produce corrective torque $M_{c1}$. Thus, the magnitude of caging torques $M_{1a}$ and $M_{1b}$ are effectively averaged over a ten second period rather than being limited to the value at the last instant of storage as is the case in previous smoothing systems. It is to be particularly noted that the times utilized in the example are for the purpose of illustration and example only and are not a limitation of this invention.

The advantages of the magnetic smoothing system just described over previous smoothing systems are numerous. The total weight of the magnetic smoothing system is much less, since complicated electronic circuits are not necessary. This is an important factor if the gyro stabilized platform is to be airborne. There is considerable savings in costs, since delicate and expensive electronic circuits are not necessary. The smoothing systems of the aforementioned patent applications of Picardi et al. and Ashby being essentially of the "last chance" variety, may have a small residual torque causing an undesired drift of the axis being stabilized. Since the smoothing system contemplated by this invention stores information over a considerable period of time, the corrective torques which are produced are more nearly an average value of the disturbing torques.

Although this invention has been described and illustrated in detail it is to be clearly understood that the same is by way of illustration and example only and is not to be taken by way of limitation, the spirit and scope of this invention being limited only by the terms of the appended claims.

I claim:

1. Means for stabilizing a device about a single axis in space comprising a pair of periodically reversing gyroscopes having their input axes parallel to said single axis in space, means for applying torque to said device about said single axis in space in response to each of said gyroscopes in turn, servo means caging the gyroscope not in control of said single axis in space, said gyroscopes reversing in spin direction while caged, said servo means including signal generating means having an electric signal output which is a function of the instantaneous torque required to cage said noncontrolling gyroscope, magnetic recording means connected to record separately said electric signal outputs of said signal generating means before and after reversal of the spin direction of said gyroscope, and detector means connected to actuate said servo means of the gyroscope in control of said single axis in space in response to the electric signal outputs recorded before and after reversal of the spin direction of said gyroscope.

2. Stabilizing means as recited in claim 1 in which said magnetic recording means comprises a multichannel closed loop magnetic recorder connected to record on separate channels the electric signal outputs of said signal generating means while said servo means is controlling one of said gyroscopes over a predetermined time interval before reversal of said gyroscope and after reaching stability in the reverse direction and to record on separate channels the electric signal outputs of said signal generating means while said servo means is controlling the other of said gyroscopes over a predetermined time interval before reversal of said other gyroscope and after reaching stability in the reverse direction.

3. Means for stabilizing a device about a single axis in space comprising a pair of periodically reversing gyroscopes having their input axes parallel to said single axis in space, electrical pick-off means on each of said gyroscopes positioned to detect movement about the precession axis of said gyroscope, main torquing means positioned to apply torque to said device about said single axis in space in response to each of said pick-off means in turn, caging torquer means on each of said gyroscopes positioned to cage said gyroscope while not controlling said single axis in space by opposing movement about the precession axis of said gyroscope in response to the corresponding pick-off, each of said gyroscopes reversing in spin direction while caged, magnetic recording means connected to record separately the outputs of said pick-off means of each of said gyroscopes for a predetermined time interval before and after reversal of the spin direction of said gyroscope, and detector means connected to actuate continuously said caging torquer means of the gyroscope in control of said single axis in space in response to the sum of the two outputs recorded from the pickoff means of said gyroscope whereby a corrective torque is applied to each of said gyroscopes while controlling said single axis in space to thereby eliminate the adverse effects of disturbing torques.

4. Stabilizing means as recited in claim 3 in which said magnetic recording means comprises a pulse width modulator responsive to the outputs of the pick-off means of the caged gyroscope, and a multichannel closed loop magnetic recorder connected to record on separate channels the output of said pulse width modulator before and after reversal of each gyroscope, each of said separate channels recording signals for a period of time equivalent to at least one complete revolution of said recorder, and in which said detector means includes flip-flop circuits connected to convert said recorded signals to pulse width modulated signal, summing means responsive to said flip-flop circuits and having an output which is a measure of the sum of the signals recorded before and after reversal of the spin direction of the gyroscope in control of said single axis in space, and a pulse width demodulator responsive to said summing means and connected to actuate the caging torquer means of the gyroscope in control of said single axis in space.

5. An apparatus for stabilizing a device about a single axis in space comprising a pair of reversible gyroscopes having their input axes parallel to said single axis in space, means for continuously controlling the orientation of said device alternately in response to each of said gyroscopes, servo means on each of said gyroscopes connected to cage said gyroscope while not in control of the orientation of said device, means for reversing the spin direction of each of said gyroscopes while caged, magnetic recording means responsive to said servo means and connected to record separately signals which are proportional to the torques required to cage each of said gyroscopes during each spin direction, summing means selectively connected to add the signals recorded proportional to the caging torques of the gyroscope controlling said device, and torquing means on each of said gyroscopes subjected to the output of said summing means while said gyroscope is controlling said device and positioned to apply a corrective torque to said gyroscope while said gyroscope is controlling said single axis in space whereby the disturbing torques acting on said gyroscopes and which are independent of the spin directions of said gyroscopes are counteracted while said gyroscopes are controlling said single axis in space.

6. An apparatus as recited in claim 5 in which said magnetic recording means comprises a four-channel closed loop magnetic drum recorder.

7. An apparatus for stabilizing a device about a single axis in space comprising a pair of reversible gyroscopes having their input axes parallel to said single axis in space, means for controlling the orientation of said device alternately in response to each of said gyroscopes, servo means on each said gyroscope connected to cage said gyroscope when not controlling the orientation of said device, means for reversing the spin direction of each of said gyroscopes while caged, magnetic recording means connected to record signals which are a function of the torques required to cage said gyroscopes during each spin direction, summing means selectively connected to said magnetic recording means in a manner to obtain as separate outputs the sum of the signals recorded relative to the caging torques of each gyroscope, and torquing means on each of said gyroscopes selectively subjected to the corresponding output of said summing amplifier and positioned to apply a corrective torque to said gyroscope while controlling the orientation of said device whereby the disturbing torques acting on said gyroscopes are continuously compensated for to the extent that said disturbing torques are independent of the spin direction of said gyroscopes.

8. An apparatus as recited in claim 7 in which said magnetic recording means comprises a pulse width modulator, a four-channel closed loop magnetic recorder, flip-flop circuits, and a pulse width demodulator.

9. In a periodically reversed gyroscope, means for eliminating ripple drift caused by disturbing torques which are not a function of the spin direction of the gyroscope, comprising servo means connected to cage said gyroscope a predetermined time prior to, during, and after the spin direction of said gyroscope is completely reversed, magnetic recording means sensitive to said servo means for separately recording signals proportional to the outputs of said servo means during the times prior to and after complete reversal of the spin direction of said gyroscope, and summing means having as inputs said recorded signals and connected to actuate said servo means in response to the sum of said inputs during the times said gyroscope is not caged by said servo means whereby said servo means continuously exerts a torque on said gyroscope equal and opposite to said disturbing torques.

10. A device as recited in claim 9 in which said magnetic recording means comprises a pulse width modulator sensitive to said servo means, a multichannel closed loop magnetic recorder coupled to store separately the output signals of said modulator for periods of time equivalent to at least one complete revolution of said recorder prior to and after complete reversal of the spin direction of said gyroscope, reading head means connected to detect the signals recorded on each channel of said recorder, flip-flop circuits responsive to said detected signals, and a pulse width demodulator connected to demodulate the output signals of said flip-flop circuits whereby signals proportional to said caging torques are stored while said gyroscope is caged and detected while said gyroscope is not caged.

11. Apparatus for stablizing a device about a single axis in space comprising a self-compensating gyro stabilized platform having two reversible gyroscopes alternately stablizing said single axis in space, servo means connected to cage said gyroscopes while not controlling said single axis in space, means for reversing the spin direction of each of said gyroscopes while caged, modulator means having outputs proportional to the separate caging torques of said gyroscopes, magnetic recording means connected to store separately the signal outputs of said modulator means, detector and summing amplifier means connected to detect and add the recorded signals relating to the caging torques in each spin direction of the gyroscope controlling said single axis in space, demodulator means responsive to the output of said summing amplifier means and corrective torquer means responsive to the output of said modulator means and positioned to act on said gyroscope controlling the axis of stabilization in a manner to oppose the disturbing torques.

12. Apparatus as recited in claim 11 in which said magnetic recording means comprises a four-channel closed loop magnetic recorder, a separate output of said modulator means being coupled to each channel, and in which said detector means is connected to detect the signals recorded relating to the two caging torques of a single gyroscope during the time said gyroscope is controlling said single axis in space.

13. Apparatus as recited in claim 11 in which said modulator and demodulator means are a pulse width modulator and a pulse width demodulator, respectively, and in which said detector means includes flip-flop circuits.

14. Apparatus for eliminating the ripple drift due to disturbing torques acting on the gyroscopes of a device being stabilized about a single axis in space comprising a self-compensating gyro stabilized platform having two reversible gyroscopes alternately stabilizing said single axis in space, servo means connected to cage said gyroscopes while not controlling said single axis in space, means for reversing the spin direction of each of said gyroscopes while caged, a pulse width modulator responsive to said servo means of the caged gyroscope, a four-channel closed loop magnetic drum recorder having a separate recording head on each channel, switching means connecting the output of said pulse width modulator to a different recording head during each spin direction of each gyroscope while said gyroscope is caged, two flip-flop circuits, switching means coupling said flip-flop circuits to the recording heads of the two channels on which the signals proportional to the caging torques of the controlling gyroscope are recorded, a summing amplifier having as inputs the outputs of said flip-flop circuits, a pulse width demodulator responsive to the output of said summing amplifier, a corrective torquer positioned to act on each of said gyroscopes, and switching means coupling the output of said pulse width demodulator to actuate the corrective torquer of the gyroscope in control of the axis of stabilization whereby said disturbing torques are continuously and completely counteracted by a corrective torque, thereby eliminating the ripple drift.

References Cited by the Examiner

UNITED STATES PATENTS

| | | | |
|---|---|---|---|
| 2,470,773 | 5/49 | Haskins | 74—5.6 X |
| 2,524,553 | 10/50 | Wendt | 74—5.7 X |
| 2,566,305 | 9/51 | Beacom | 74—5.34 X |

BROUGHTON G. DURHAM, *Primary Examiner.*

NORMAN H. EVANS, *Examiner.*